Jan. 2, 1968  HANS-JOACHIM JANSSEN  3,361,914
PLASTIC SUPPORT FOR MOTORS
Filed Aug. 20, 1965

Inventor:
Hans-Joachim Janssen
By Spencer & Kaye
Attorneys

United States Patent Office 3,361,914
Patented Jan. 2, 1968

3,361,914
PLASTIC SUPPORT FOR MOTORS
Hans-Joachim Janssen, Hundsmuhlen uber, Oldenburg, Germany, assignor to Licentia Patent-Verwaltungs-G.m.b.H., Frankfurt am Main, Germany
Filed Aug. 20, 1965, Ser. No. 481,298
7 Claims. (Cl. 310—51)

ABSTRACT OF THE DISCLOSURE

Plastic support for a small electric motor including a main body connectible to the motor, a cylindrical slide bearing for receiving the motor shaft, and resilient webs disposed between the slide bearing and the main body for insulating rotor vibrations and for permitting the bearing to align itself with the motor shaft.

The present invention relates to a bearing support, made of plastic, for small electric motors such as drive motors for use in sound reproducing apparatus, which support has good vibration insulating characteristics.

There exist various types of bearing supports which, however, have been found not to provide adequate vibration insulation, and it is, therefore, the primary object of the present invention to provide a bearing support which does afford the requisite vibration insulation, and which is, therefore, suitable for use in sound reproducing equipment as, for example, tape recorders.

With the above object in view, the present invention resides mainly in a support element, suitable for use in a small motor, which support element supports the shaft of the motor and comprises a plastic main body connectible to the motor and provided with an opening having a wall, as well as a slide bearing which is also made of plastic material and which is peripherally spaced from the wall. Interconnecting the bearing and the main body are resilient web means which form vibration insulating means that are interposed between the bearing and the main body and which allow the bearing to align itself with the motor shaft.

Additional objects and advantages of the present invention will become apparent upon consideration of the following description when taken in conjuction with the accompanying drawings in which.

Figure 1:
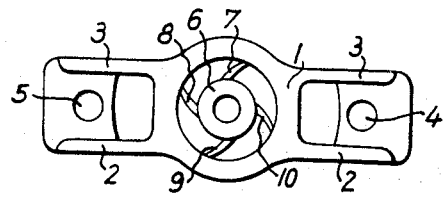
FIGURE 1 is a plan view of one embodiment of a bearing support according to the present invention.

Referring now to the drawing and first to FIGURE 1 thereof, the same shows a plastic bearing support in the form of a bracket 1 having a main body whose edges are provided with bead-like reinforcements 2 and 3. The bracket is further provided for bores 4 and 5 through which may be passed screws (not shown) that allow the bracket to be fastened to the stator casing of a small electric motor. In the central region of the bracket, there is provided a circular or circular-like opening within which is located a cylindrical anti-friction or slide-type bearing 6 for supporting the shaft of the motor, this bearing being peripherally spaced from the wall defining the opening and being secured to the main body of the bracket by means of generally radial webs 7, 8, 9, 10. The bearing 6 is likewise made of plastic material. The webs which are interposed between the bearing and the main body form a vibration insulating means between these parts and allow the bearing to align itself with the motor shaft. It will thus be seen that the main body of the bracket forms an outer frame and the centrally arranged bearing forms an inner frame, the two frames being resiliently connected to each other by means of the resilient webs. In this way, the bracket as a whole acts as a spring element which serves to decouple the axial and radial vibrations of the rotor of a small electric motor.

It will be appreciated from the above that, in accordance with the present invention, the bracket itself has a self-aligning cylindrical bearing which can position itself thanks to the provision of the resilient webs. Heretofore, cylindrical slide bearings could not be used in small, fractional horsepower motors inasmuch as the problem of how to make it possible for the bearing to align itself presented enormous structural difficulties.

The support bracket, according to the present invention, has the additional advantage that it can be made in one operation and from one piece in which the main body of the bearing support, the radial webs and the bearing are integral with each other.

Figure 2:
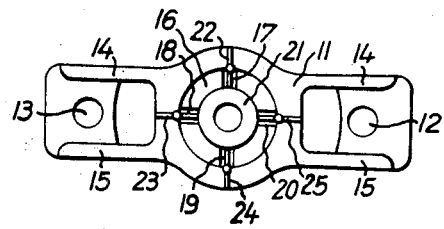
FIGURE 2 is a plan view of another embodiment of a bearing support according to the present invention.
Figure 3:
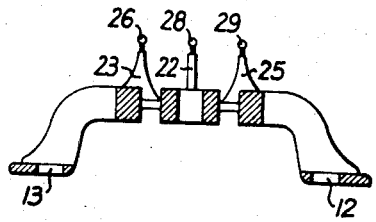
FIGURE 3 is an elevational view, partly in section, of the support shown in FIGURE 2.

In the embodiment of FIGURES 2 and 3, the bracket 11 is provided with bores 12 and 13 and with bead-like reinforcements 14 and 15 arranged at the edges. Arranged in the central opening 16 are the radially oriented resilient webs 17, 18, 19, 20, which hold a cylindrical slide bearing 21. In this embodiment, the bracket is additionally provided with a plurality of axially extending prongs 22, 23, 24, 25, whose ends are enlarged as shown in the drawing for the ends 26, 28 and 29. These prongs serve as a plug-type connector by means of which the bracket, and with it a motor to which it is connected, may be plugged to a sound reproducing apparatus, and serve as a vibration insulating, central coupling.

It will be understood that the above description of the present invention is susceptible to various modifications, changes, and adaptations, and the same are intended to be comprehended within the meaning and range of equivalents of the appended claims. For example, the webs may have an oval, round or rectangular cross section, or they can be strip-like. Nor is the present invention limited to bracket-shaped bearing supports, but is also applicable to plastic bearing plates, i.e., end plates attached to the motor.

What is claimed is:
1. For use in a small electric motor, a support element for supporting the shaft of the motor and comprising:
 (a) a plastic main body connectible to the motor and provided with an opening having a wall;
 (b) a plastic cylindrical slide bearing arranged within said opening, said bearing being peripherally spaced from said wall defining said opening;
 (c) resilient web means interconnecting said bearing and said main body, said resilient web means forming vibration insulating means that are interposed between said bearing and said main body and allowing said bearing to align itself with the motor shaft; and
 (d) axially extending means forming a plug-type connection for securing the element, and with it a motor to which it is connected, to a piece of electrical machinery.

2. A support element as defined in claim 1 wherein said web means include a plurality of angularly spaced webs, each extending from said bearing to said wall defining said opening.

3. A support element as defined in claim 1 wherein said main body, said bearing and said web means constitute an integral member.

4. A support element as defined in claim 1 wherein said element is bracket-shaped.

5. A support element as defined in claim 1 wherein said element is plate-shaped.

6. A support element as defined in claim 1 wherein said axially extending means comprise a plurality of prongs.

7. A motor arrangement comprising, in combination:
(a) a small electric motor having a housing and a rotatable shaft;
(b) a plastic main body connected to said housing of said motor and provided with an opening having a wall;
(c) a plastic cylindrical slide bearing arranged within said opening and supporting said motor shaft, said bearing being peripherally spaced from said wall defining said opening;
(d) resilient web means interconnecting said bearing and said main body, said resilient web means forming vibration insulating means that are interposed between said bearing and said main body and allowing said bearing to align itself with said motor shaft; and
(e) axially extending means forming a plug-type connection for securing said plastic main body, and with it said web means, said bearing and said motor, to a piece of electrical machinery.

References Cited

UNITED STATES PATENTS

| | | | |
|---|---|---|---|
| 2,945,988 | 7/1960 | Henry | 310—51 |
| 2,810,084 | 10/1957 | Sprando | 310—67 |
| 2,828,616 | 4/1958 | Zeigler | 310—51 |
| 2,465,446 | 3/1949 | Gorfin | 310—51 |
| 2,515,799 | 7/1950 | Rouy | 308—26 |
| 2,936,141 | 5/1960 | Rapata | 248—26 |

FOREIGN PATENTS 948,382   2/1964   Great Britain.

MILTON O. HIRSHFIELD, *Primary Examiner.*

CHANCELLOR E. HARRIS, J. D. MILLER, *Examiners.*

F. DOMOTOR, *Assistant Examiner.*